US 8,645,659 B1

United States Patent
Winokur (10) Patent No.: US 8,645,659 B1
(45) Date of Patent: Feb. 4, 2014

(54) METHOD FOR MANAGING VOLUMES/SNAPSHOTS IN POOLS OF EXTERNAL VIRTUAL MEMORY

(75) Inventor: Alex Winokur, Haifa (IL)

(73) Assignee: Infinidat Ltd., Herzliya (IL)

( * ) Notice: Subject to any disclaimer, the term of this patent is extended or adjusted under 35 U.S.C. 154(b) by 424 days.

(21) Appl. No.: 12/957,613

(22) Filed: Dec. 1, 2010

(51) Int. Cl.
*G06F 12/02* (2006.01)

(52) U.S. Cl.
USPC .......... 711/171; 711/170; 711/202; 711/203; 711/206

(58) Field of Classification Search
USPC .................... 711/170, 171, 202, 203, 206
See application file for complete search history.

(56) References Cited

U.S. PATENT DOCUMENTS

| | | | |
|---|---|---|---|
| 5,584,008 A | 12/1996 | Shimada et al. | |
| 5,673,382 A | 9/1997 | Cannon et al. | |
| 6,954,768 B2 | 10/2005 | Carlson et al. | |
| 7,275,103 B1 | 9/2007 | Thrasher et al. | |
| 7,783,847 B2 | 8/2010 | Moore et al. | |
| 2004/0068636 A1* | 4/2004 | Jacobson et al. | 711/203 |
| 2004/0153606 A1 | 8/2004 | Schott | |
| 2007/0067583 A1 | 3/2007 | Zohar et al. | |
| 2008/0016121 A1 | 1/2008 | Revah et al. | |
| 2009/0019251 A1 | 1/2009 | Helman et al. | |

FOREIGN PATENT DOCUMENTS

WO   WO 2010/085228 A1   7/2010

OTHER PUBLICATIONS

Symantec, "Veritas CommandCentral™—Supporting the Virtual Enterprise," *White Paper: Storage Management*, Apr. 2009.
U.S. Appl. No. 13/004,947, filed Jan. 12, 2011, titled "Storage System and Method of Operating Thereof".
U.S. Appl. No. 13/008,373, filed Jan. 18, 2011 in the name of Alex Winokur.
U.S. Appl. No. 13/081,963, filed Apr. 7, 2011 in the name of Alex Winokur.
U.S. Appl. No. 12/941,246, filed Nov. 8, 2010 in the name of Alex Winokur.

* cited by examiner

*Primary Examiner* — Jae Yu
(74) *Attorney, Agent, or Firm* — Wiggin and Dana LLP; Gregory S. Rosenblatt (57) ABSTRACT

A method for managing resources in a storage pool of external virtual memory, that includes a host manager being associated with a storage pool by a storage manager. The host manager manages the resources, the managing including creating resources in the storage pool and/or deleting resources in the storage pool. The host manager further accesses the resource in the pool, such accessing including reading data to or writing data to the resource.

7 Claims, 6 Drawing Sheets

METHOD FOR MANAGING VOLUMES/SNAPSHOTS IN POOLS OF EXTERNAL VIRTUAL MEMORY

FIELD OF THE INVENTION

This invention is in the general field of host based storage management.

BACKGROUND OF THE INVENTION

Figure 1:
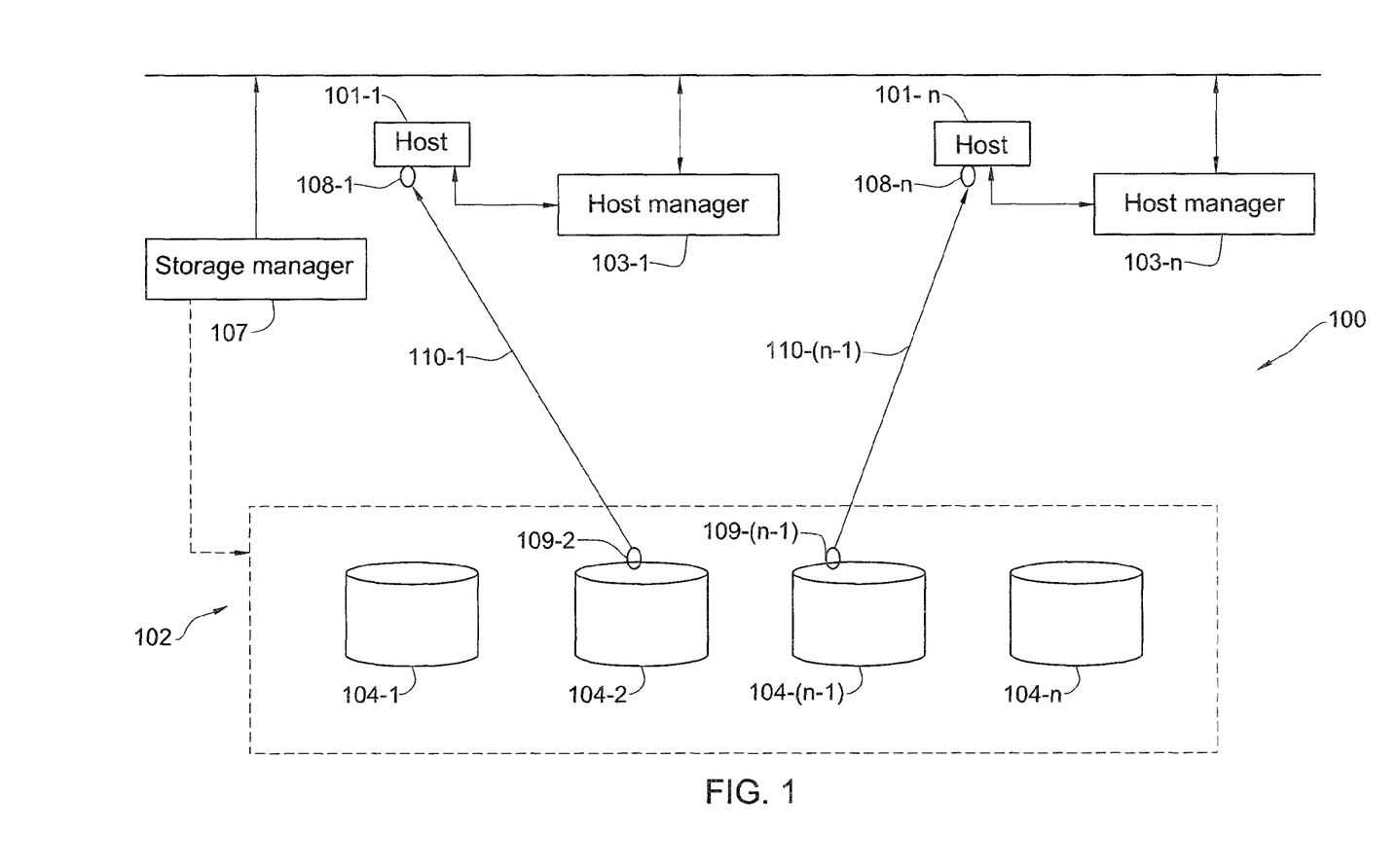
FIG. 1 is a schematic illustration of a prior art system for accessing data in an external virtual memory.

Attention is first drawn to FIG. 1 illustrating a schematic illustration of a system 100 for accessing data in an external virtual memory. The system includes one or more hosts 101-1 to 101-n, hosting each, one or more applications (not shown) and coupled to a storage system 102 for accessing data residing in an external storage system. The data resides in volumes (denoted $V_S$, not shown in FIG. 1) of external virtual memory (say in virtual disk units 104-1 to 104-n).

An application (not shown) in Host 101-1 accesses a volume of external virtual memory 104-2 through a handle being for example ITL where I stands for initiator port say 108-1 and T stands for a target port say (109-2) and L stands for LUN say 110-1. As is well known, the host may employ a plurality of initiator ports each of which is associated to one or more applications. The virtual memory may employ a plurality of target ports typically according to the number of volumes stored in the virtual memory where each pair of corresponding initiator port and target port is connected by means of unique Logical Unit Number—LUN. Thus, for example, initiator port 108-n and target port 109-(n−1) are connected through unique LUN (110 n−1). The specified volumes may represent respective snapshots (each volume representing one or more snapshot) of data of a primary volume associated with the host.

There are also shown host management modules 103-i each associated with its respective host 101-i operating under the control of Storage manager module 107 (possibly with the intervention of human storage administrator) for providing handles viewed by the volumes and by the applications. It is thus evident that for an application to access data (utilizing an access protocol command, say SCSI), in a volume of virtual memory, an ITL that associates the application and the volume is utilized. The volume is viewable to the application by associating the handle (e.g. ITL) to the application by an application viewable volume $V_h$ allowing the application to access the associated volume. Note that the syntax of $V_h$ is operating system specific. For MS windows operating systems for example, $V_h$ is typically of the form X: where X can be any single alphabet letter.

Whenever an application wants to access a given volume, it must request the storage manager 107 (possibly through intervention of the human storage administrator) to allocate an ITL for associating a given initiator port of the application in the host to a target port of the designated volume in the virtual external memory. The application will access the specified given volume by means of the application viewable volume $V_h$. The description with reference to FIG. 1 exemplifies a mechanism by which a host (e.g. 101-1) accesses volumes in an external virtual memory 102.

It should be noted that Storage pools is a mechanism used by storage administrators (e.g. manager 107) to monitor and control storage allocation to hosts, most typically in the case of volumes with snapshots or of thin volumes. A storage manager allocates a storage pool in accordance with the size of the storage quota to be allocated for a particular user, which accesses the system via a host or via a group of hosts. The storage pool forms part of storage system 102 (e.g. a storage pool residing in virtual disk unit 104-1 or spread across more than one virtual disk unit 104-i). All volumes for this user are allocated then by the storage manager 107 from this storage pool. This is particularly useful in the case of snapshots, because while one can anticipate the amount of snapshots to be created by the user, it is difficult to anticipate the rate of change of data in the source after any snapshot is created, and accordingly it is difficult to anticipate the amount of additional storage space that will be needed as new data is created as part of the snapshot mechanism. Hence, the pools provide a flexible way to manage the space allocated to a certain user. When the space in the pool is depleted no more data can be allocated for volumes associated with the pool and no new volumes can be created which use space associated with this pool. At this point the storage manager/administrator may free some space by deleting some volumes or snapshots, increase the pool size or abort the new data allocation.

The storage manager 107 (administrator) is also in charge of imposing security rules, for instance authorizing or denying access of the host to given volumes/snapshots (e.g. residing in storage pools).

Storage pools allow a flexible allocation of storage space particularly in this case of volumes with snapshots. Using pools, together with other techniques which are well known in the art, a user can create snapshots and use space which was allocated in the pool with no need to interact with the storage manager. However, if the user wants to access one of the snapshots that were created, this access requires the creation of an ITL as explained above. In the prior art this requires human interaction and agreement between the host administrator and the storage administrator, thus curtailing the flexibility that was provided by the use of pools. This limitation is partially alleviated with the help of an external virtualization agent such as a Veritas volume manager.

Using this solution, a large volume can be allocated to a user and this user can, using virtualization technologies, divide this volume into sub-volumes, allocate the sub-volume to applications, and also work with pools in a similar way to that specified above. However, such solutions have their own limitations, adding a new agent that requires attention, consumes resources and affects performance.

There is a need in the art to provide for a new method for host based storage management.

Prior art references considered to be relevant as a background to the presently disclosed subject matter are listed below. Acknowledgement of the references herein is not to be inferred as meaning that these are in any way relevant to the patentability of U.S. Pat. No. 6,954,768 discloses a method, system, and article of manufacture for pooling of storage. Volume attributes are assigned to a plurality of physical volumes. Pool attributes are assigned to a plurality of storage pools, wherein the pool attributes include policies for borrowing and returning the plurality of physical volumes to and from the plurality of storage pools. One of the plurality of physical volumes is allocated to one of the plurality of storage pools based on the volume attributes of the one of the plurality of physical volumes and the pool attributes of the one of the plurality of storage pools.

the presently disclosed subject matter disclosed herein:

U.S. Pat. No. 7,783,847 discloses a computer readable medium comprising executable instructions for reallocating blocks in a storage pool, which when executed by a processor performs a method, the method comprising: copying a plurality of source blocks to a plurality of replacement blocks, wherein the plurality of source blocks is stored on a source disk in the storage pool, and wherein the plurality of replacement blocks is stored on at least one replacement disk in the storage pool; generating a first indirection object, wherein the first indirection object comprises a mapping of locations of the plurality of source blocks to locations of the plurality of replacement blocks; modifying a replacement block selected from the plurality of replacement blocks using a copy-on-write transaction; and removing a reference to the replacement block from the first indirection object once the copy-on-write transaction is complete.

U.S. Pat. No. 5,584,008 discloses an external storage system connected to a host apparatus includes a plurality of storage devices, and a control unit for controlling the above described plurality of storage devices, wherein the above described control unit manages a storage space formed by the above described plurality of storage devices by dividing the storage space into a first storage pool to be directly accessed by the above described host apparatus and a second storage pool not to be directly accessed by the above described host apparatus.

US2004/0153606 discloses systems and methods which include among other things, systems for providing a block level data storage service. More particularly, the systems and methods of the invention provide a block level data storage service that provides differentiated pools of storage on a single storage device. To this end, the systems and methods described herein leverage the different performance characteristics across the logical block name (LBN) space of the storage device (or devices). These different performance characteristics may be exploited to support two or more classes of storage on a single device.

U.S. Pat. No. 5,673,382 discloses a data processing system providing disaster recovery and using a client-server configuration which includes a method and apparatus for reclaiming off-site storage volumes without requiring the volumes to be mounted or transported to the primary site. The system includes primary volumes and resident copy volumes at the primary site and off-site storage volumes for disaster recovery at the remote site. The system first determines which off-site storage volumes are eligible for reclamation. For each eligible off-site volume, the system locates, within the primary site, a primary copy of every file remaining on the off-site volume that is still required for disaster recovery. These primary copies are then copied to a resident recovery volume at the primary storage site. The eligible off-site volume is then marked empty, and the resident recovery volume is classified as an off-site volume. The resident recovery volume is then transported to the remote storage site and the empty off-site volume is returned to the primary storage site to be reused as a resident copy volume.

SUMMARY OF THE INVENTION

In accordance with an aspect of the presently disclosed subject matter, there is provided a method for managing resources in a storage pool of external virtual memory, comprising:
(a) a host manager being associated with a storage pool by means of a storage manager;
(b) the host manager managing the resources, wherein the managing includes:
   i) creating at least one resource in the storage pool;
   ii) deleting at least one resource in the storage pool;
(c) the host manager accessing at least one resource in the pool, the accessing includes reading data to or writing data to the resource.

In accordance with an embodiment of the presently disclosed subject matter, there is provided a method, wherein a host manager being associated with a storage pool by means of a storage manager includes the host manager receiving a created handle attached to a created pool volume that is associated with the storage pool, and wherein the host manager manages the resources, wherein the managing includes the host manager provisioning management commands to the pool volume utilizing the handle, for execution of the command in the pool.

In accordance with an embodiment of the presently disclosed subject matter, there is further provided a method, wherein the handle includes an initiator port for attaching to the host, a target port for attaching to the pool volume, and LUN uniquely identifying the handle.

In accordance with an embodiment of the presently disclosed subject matter, there is yet further provided a method, wherein the management command forms part of an I/O protocol.

In accordance with an embodiment of the presently disclosed subject matter, there is yet further provided a method, wherein the I/O protocol being the SCSI protocol.

In accordance with an embodiment of the presently disclosed subject matter, there is yet further provided a method, wherein the names of the pool and pool volume are algorithmically related.

In accordance with an embodiment of the presently disclosed subject matter, there is yet further provided a method, wherein the resources are selected from a group that includes at least one of the following, volume, thin volume, snapshot.

In accordance with an aspect of the presently disclosed subject matter, there is yet further provided a method for facilitating management of resources in a storage pool of external virtual memory, comprising a storage manager creating a pool volume and a unique handle; the storage manager attaching the handle to a host manager and to the pool volume; the storage manager creating a pool and associating the pool to the pool volume.

In accordance with an embodiment of the presently disclosed subject matter, there is yet further provided a method, wherein the handle includes an initiator port for attaching to the host, a target port for attaching to the pool volume, and LUN uniquely identifying the handle.

In accordance with an embodiment of the presently disclosed subject matter, there is yet further provided a method, wherein the management command forms part of an I/O protocol.

In accordance with an embodiment of the presently disclosed subject matter, there is yet further provided a method, wherein the I/O protocol being the SCSI protocol.

In accordance with an embodiment of the presently disclosed subject matter, there is yet further provided a method, wherein the resources are selected from a group that includes at least one of the following, volume, thin volume, snapshot.

In accordance with an aspect of the presently disclosed subject matter, there is yet further provided a method for management of resources in a storage pool of external virtual memory, comprising a storage manager receiving through a handle attached to a pool volume a management command indicative of managing a resource in a pool associated with the pool volume; the storage manager executing the management command in the pool.

In accordance with an embodiment of the presently disclosed subject matter, there is yet further provided a method, wherein the handle includes an initiator port for attaching to the host, a target port for attaching to the pool volume and LUN uniquely identifying the handle.

In accordance with an embodiment of the presently disclosed subject matter, there is yet further provided a method, wherein the management command forms part of an I/O protocol.

In accordance with an embodiment of the presently disclosed subject matter, there is yet further provided a method, wherein the I/O protocol being the SCSI protocol.

In accordance with an embodiment of the presently disclosed subject matter, there is yet further provided a method, wherein the SCSI command appears in (Command Descriptor Block) CDB format.

In accordance with an embodiment of the presently disclosed subject matter, there is yet further provided a method, wherein the executing includes transforming the CDB SCSI command format to comply with Command Line Interface (CLI) standard.

In accordance with an embodiment of the presently disclosed subject matter, there is yet further provided a method, wherein the resources are selected from a group that includes at least one of the following, volume, thin volume, snapshot.

In accordance with an embodiment of the presently disclosed subject matter, there is yet further provided a method, wherein the managing includes at least one of the following: creating in the pool a new resource designated in the management command; or deleting from the pool an existing resource that is designated in the management command.

In accordance with an embodiment of the presently disclosed subject matter, there is yet further provided a method, wherein the managing of deleting from the pool an existing resource that is designated in the management command does not utilize virtualization of volumes familiar only to the host manager and not to storage manager.

In accordance with an embodiment of the presently disclosed subject matter, there is yet further provided a method, wherein the host manager manages the volumes or snapshots in the pool through a mechanism that a host accesses volumes in external virtual memory.

In accordance with an aspect of the presently disclosed subject matter, there is yet further provided a system for managing resources in a storage pool of external virtual memory, comprising a host manager being associated with a storage pool by a storage manager, a resource management module of the host manager configured to manage the resources, wherein the managing includes:
  i. creating at least one resource in the storage pool;
  ii. deleting at least one resource in the storage pool;
  a host associated with the host manager configured to access at least one resource in the pool, the accessing includes reading data to or writing data to the resource.

In accordance with an embodiment of the presently disclosed subject matter, there is yet further provided a system for facilitating management of resources in a storage pool of external virtual memory, comprising a storage manager creating a pool volume and a unique handle; a pool resource control module of the storage manager configured to attach the handle to a host manager and to the pool volume; the pool resource control module of the storage manager configured to create a pool and associating the pool to the pool volume.

In accordance with an aspect of the presently disclosed subject matter, there is yet further provided a system for management of resources in a storage pool of external virtual memory, comprising a resource management module of the storage manager configured to receive through a handle attached to a pool volume a management command indicative of managing a resource in a pool associated with the pool volume; the resource management module of the storage manager configured to execute the management command in the pool.

In accordance with an aspect of the presently disclosed subject matter, there is yet further provided a computer program product for managing resources in a storage pool of external virtual memory, the product is associated with a host manager that is associated with a storage pool; the product includes a storage storing computer code comprising a computer code portion for managing the resources, wherein the managing includes creating at least one resource in said storage pool; deleting at least one resource in the storage pool; a computer code portion for accessing at least one resource in the pool, the accessing includes reading data to or writing data to the resource.

In accordance with an aspect of the presently disclosed subject matter, there is yet further provided a computer program product for facilitating management of resources in a storage pool of external virtual memory, the product includes a storage storing computer code comprising a computer code portion for creating a pool volume and a unique handle; a computer code portion for attaching the handle to a host manager and to the pool volume; a computer code portion for creating a pool and associating the pool to the pool volume.

In accordance with an aspect of the presently disclosed subject matter, there is yet further provided a computer program product for management of resources in a storage pool of external virtual memory, the product including a storage storing computer code comprising a computer code portion for receiving through a handle attached to a pool volume a management command indicative of managing a resource in a pool associated with the pool volume; a computer code portion for executing the management command in the pool.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Note that in the drawings and descriptions, identical reference numerals indicate those components or stages that are common to different examples.

Unless specifically stated otherwise, as apparent from the following discussions, it is appreciated that throughout the specification discussions utilizing terms such as receiving, provisioning, accessing, associating, attaching, identifying, detaching, reading, writing, creating, deleting, managing, executing or the like, include action and/or processes of a computer that manipulate and/or transform data into other data, said data represented as physical quantities, e.g. such as electronic quantities, and/or said data representing the physical objects.

Note that unless stated otherwise, in addition to or instead of what may be construed from the description herein, all technical and scientific terms used herein may have the same meaning as understood by one of ordinary skill in the art.

The operations of the host, host manager, storage manager, pool resource control module, resource management module, and resource access control module, in accordance with the teachings herein, may be performed by a computer specially constructed for the desired purposes or by a general purpose computer specially configured for the desired purpose by a computer program stored in a computer readable storage medium.

Figure 2:
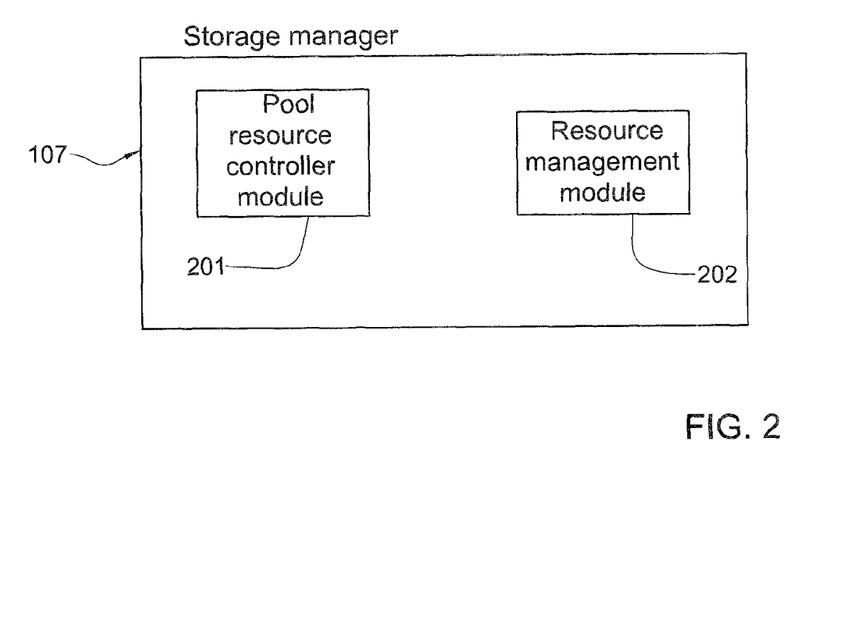
FIG. 2 illustrates a block diagram of storage manager modules, in accordance with certain embodiments of the invention.

Attention is also drawn to FIG. 2 illustrating a block diagram of a storage manager (e.g. 107 in the architecture of FIG. 1), in accordance with certain embodiments of the invention. As shown, the storage manager 107 includes pool resource controller module 201 and resource management module 202 whose operation will be described in greater detail below. Note that the specified resources may include in certain embodiments: volumes, thin volumes or snapshots. Management includes, in accordance with certain embodiments, creation or deletion of resources.

Figure 3:
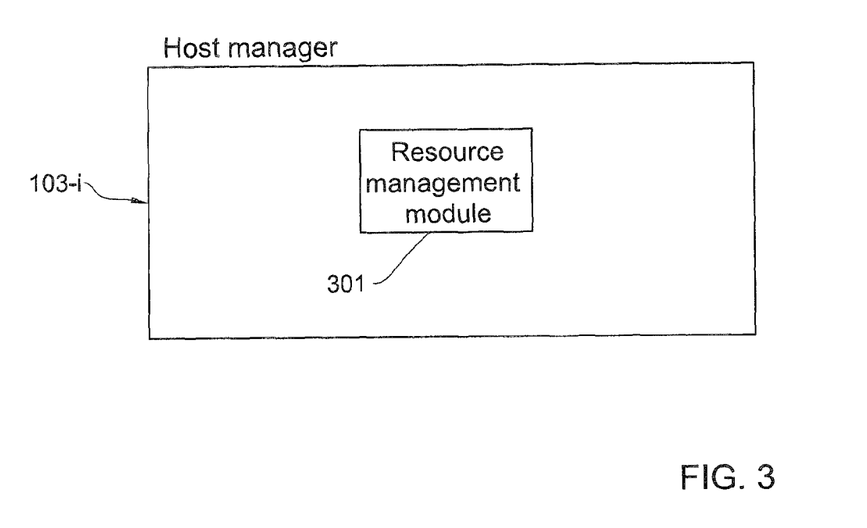
FIG. 3 illustrates a block diagram of host manager modules, in accordance with certain embodiments of the invention.

Attention is now drawn to FIG. 3 illustrating a block diagram of a host manager (e.g. 103-$i$ in the architecture of FIG. 1), in accordance with certain embodiments of the invention. As shown, the host manager 1034 includes resource management module 301 which operates in conjunction with the resource management module 202 of the storage manager 107, all as will be explained in greater detail below.

Note that the specified resources may include in certain embodiments: volumes, thin volumes or snapshots. Management includes, in accordance with certain embodiments, creation or deletion of resources.

Note that the invention is by no means bound to the specific system architecture depicted in FIGS. 2 and/or 3.

Figure 4:
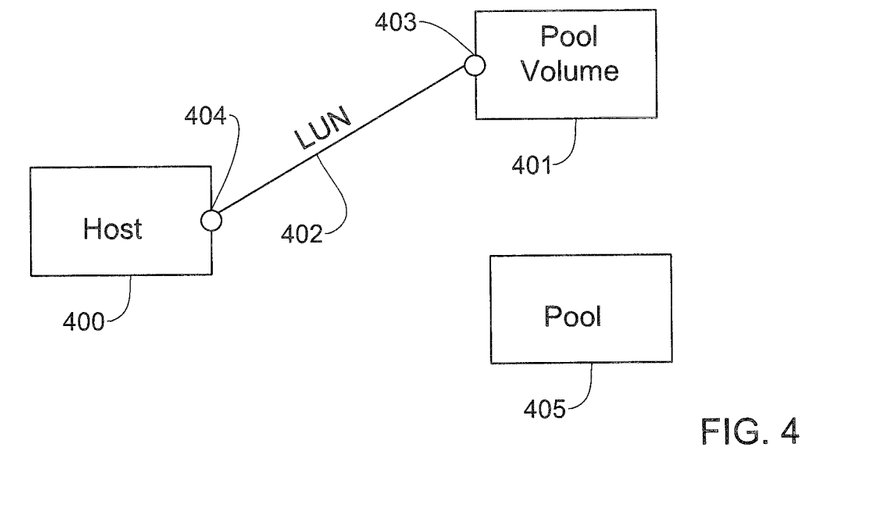
FIG. 4 is a schematic illustration of a host and extended pool, in accordance with certain embodiments of the invention.

Attention is now drawn to FIG. 4 illustrating a schematic illustration of a host and associated extended storage pool, in accordance with certain embodiments of the invention. As shown, a so called pool volume 401 is created by the storage manager (e.g. 107). The pool volume complies with the general structure of known per se volumes and in accordance with certain embodiments has an initial size 0.

The storage manager 107 further creates a handle 402 (e.g. in accordance with the ITL paradigm) allocating a unique LUN as part of the specified handle. Note that whilst the handle is depicted for clarity as a physical connection between the host and volume, those versed in the art will readily appreciate that a handle (and a unique LUN) is a logical connection between a host and a volume.

The resource control module 201 (see FIG. 2) of storage manager 107 further attaches the handle to the volume 401 through target port 403 and to the host 400 through initiator port 404, in compliance with the known per se volume ITL paradigm. The pool volume 401 will be associated with created pool 405 that forms part of the external virtual memory (e.g. 102 of FIG. 1). Each pool is defined by a name, the size of physical storage associated with it, and logical volumes associated with it. The generation of the pool volume, attachment of the handles, creation and association of the pool 405 to the pool volume may all be performed by the pool resource control module 201 of FIG. 2.

The specified architecture of extended pool (including the pool and the associated pool volume will be utilized by the host for managing resources (such as volumes/snapshots), in a manner that will be described in detail below.

In accordance with certain embodiments, the pool resource control module 201 creates the extended pools and implements the association to the host, in the manner depicted in FIG. 4.

Figure 5:
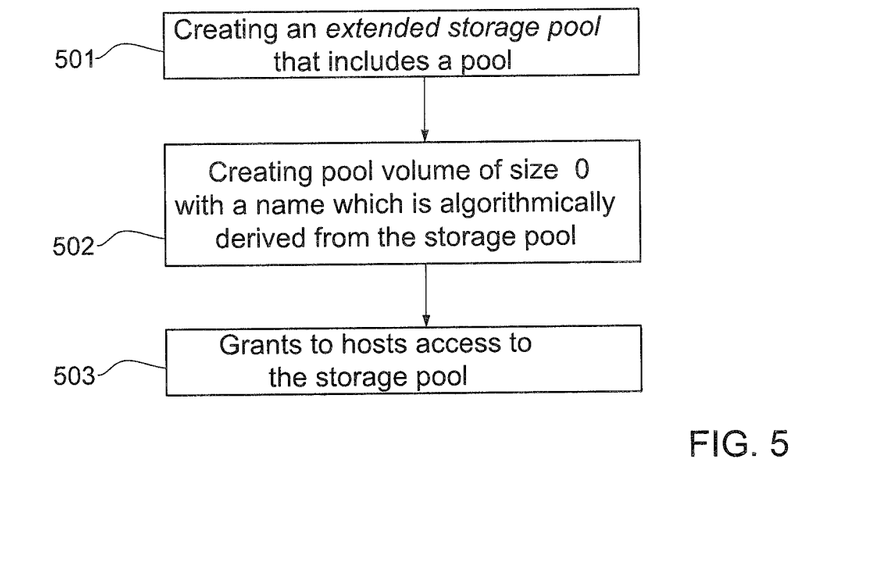
FIG. 5 is a flow chart illustrating a sequence of operations for generating an extended pool by a storage manager, in accordance with certain embodiments of the invention.

Attention is now drawn to FIG. 5 illustrating a sequence of operations for generating an extended pool by a storage manager (as outlined e.g. in FIG. 4), in accordance with certain embodiments of the invention.

Thus, in step 501, the resource control module 201 of the storage manager module 107 creates an extended storage pool that includes a pool of specific size and specific pool name (e.g. 405 of FIG. 4).

In step 502, the resource control module 201 of the storage manager module 107 creates a volume (designated "pool volume" forming part of the extended pool) of size 0 with a name which is algorithmically derived from the storage pool (e.g. 401 of FIG. 1). For instance, if VOL_TEST_POOL_NAME is the pool name then the pool volume name (algorithmically derived therefrom) may be VOL_TEST_POOL_NAME_POOLVOLUME. Note that the name relationship between the pool and the pool volume names is not necessarily algorithmically derived and obviously not limited to the example above which was provided for illustrative purposes only.

In step 503, the resource control module 201 of the storage manager module 107 grants to hosts access to the storage pool. This is accomplished by associating the pool volume 401 with the appropriate ITL 402, in a similar fashion to that of creating and attaching a volume to a host.

Note that the invention is not bound by the specified sequence of operations of FIG. 5.

Figure 6:
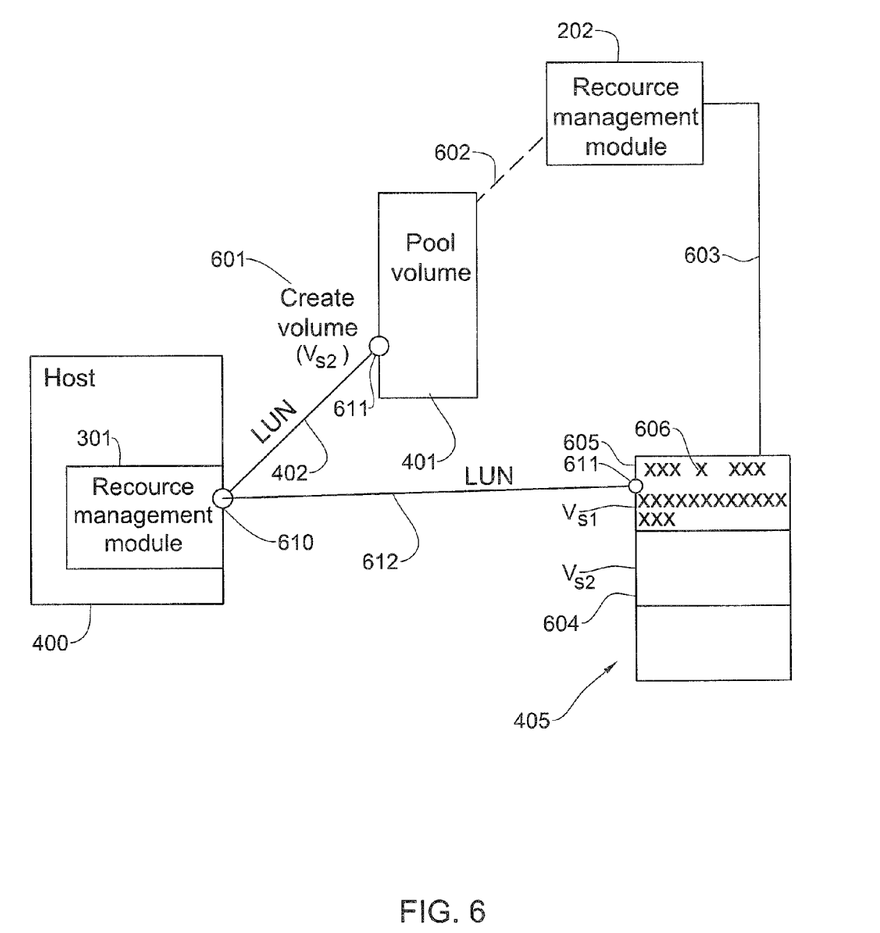
FIG. 6 illustrates schematically a volume creation, in accordance with certain embodiments of the invention.

Attention is now drawn to FIG. 6 illustrating schematically a volume creation, in accordance with certain embodiments of the invention.

Thus, the host manager (associated with host 400) issues, through its resource management module (301 of FIG. 3), a "create volume $V_{S2}$ in a pool" command 601 (e.g. imbedded in a SCSI command as will be discussed in greater detail below) and directs the command to the appropriate pool volume 401. To this end, the host manager utilizes the dedicated handle 402 attaching the host 400 to the pool volume 401. The storage manager (e.g. through its resource manager 202) receives and parses 602 the command and executes, in a known per se manner, creation 603 of volume $V_{S2}$ 604 in pool 405. For instance, the parsing (at the storage manager end) may include transforming the SCSI command into a CLI (Command Line Interface) format for implementing the management command, such as create volume. As is well known, the SCSI command appears in a so called CDB (Command Descriptor Block) format which can be modified to incorporate a CLI format. Thus by way of non limiting example, creating say a snapshot of a given volume, is implemented as follows:

Use "write buffer" command (Op code 3Bh) with mode filed 01 h (vendor specific). The latter example is of course not binding.

Reverting now to FIG. 6, note that pool 405 already accommodates volume $V_{S1}$ 605 storing data 606 indicative, for example, of snapshots of a primary volume (not shown in FIG. 6) of host 400. The resource management module 202 of the storage manager 107 executes this command by creating the requested volume of the specified name and size in the specified pool, allocating a free LUN number to it (612). In accordance with certain embodiments, an ITL is created which is based on this LUN, and an initiator port and target port, which are the same as the ones allocated for the pool volume. This can be illustrated, for example, in FIG. 6, where the initiator port 610 is the same one for both LUN numbers (represented graphically as LUNs 402 and 612). By the same token, target port 611 is the same for both LUN numbers. As may be recalled, the LUN numbers, whilst presented, for simplicity, as having physical connections between the host and the respective volumes, are in fact (as is well known) logical connections and therefore the target port 611, although presented graphically as two distinct "locations", may be common to both LUNs 402 and 612.

Note also, that the creation of the volume does not necessarily require simultaneous creation and association of the corresponding LUN (612). Accordingly, in accordance with certain embodiments, the LUN is created and associated to the so created volume only when the latter is used (e.g. for writing data such as snapshot to the volume). By performing this operation the storage system guarantees that the newly created volume is accessible to all hosts that were granted access to this pool on all previously defined ITLs.

Note that the description with reference to FIG. 6 illustrated only one pool 405 associated with the pool volume 401. This however is not obligatory, and there may be more than one pool associated with the specified pool volume. In this case the SCSI command should indicate the name of the target pool. Obviously, the resource management module 202 of the storage manager will only apply the command if the designated pool name is indeed associated to the pool volume 401. This security measure is implemented in a known per se manner.

Note that whilst the description with reference to FIG. 6 and various other embodiments illustrate usage of an SCSI command, this is a non limiting example of I/O protocol for communicating a storage.

The description with reference to FIG. 6 illustrates a management command, to create volume. Other management commands can be implemented, e.g. deleting a volume from a given pool, mutatis mutandis.

Note also that in accordance with certain embodiments, in addition to "pool" and "pool volume", also other resources such as "volume" and "volume snapshot" may have algorithmically derivative names. Thus, for instance, a volume called say VOL_TEST is created. A pool that is associated to this volume may have the name VOL_TEST_POOL_NAME (where the volume VOL_TEST is algorithmically derived from the pool name). All the snapshots in this volume may have names that are algorithmically derived from the volume name, for example: YYYY.MM.HH.MM.SS-VOL_TEST_SNAPs (where VOL_TEST_SNAPs signifies a snapshot associated with volume VOL_TEST and YYYY.MM.HH.MM.SS signifies the snapshot's creation time). Note that the name relationship between the pool, pool volume and other resources names is not necessarily algorithmically derived and obviously not limited to the example above which is provided for illustrative purposes only.

The description with reference to FIG. 6 illustrates one form of resource, i.e. a standard volume. The invention is however applicable to other resources of external virtual memory, such as snapshots or thin volumes.

Figure 7A:
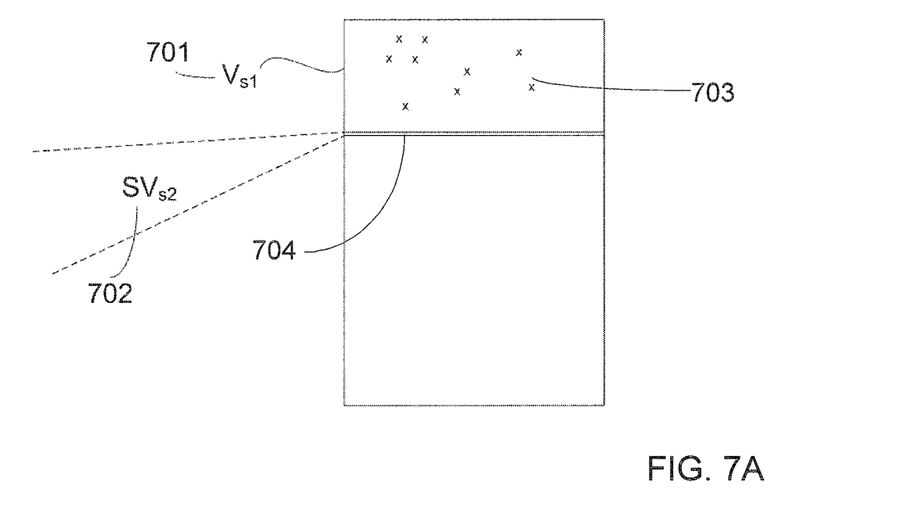
FIGS. 7A-B illustrate schematically snapshot creation and usage, in accordance with certain embodiments of the invention.
Figure 7B:
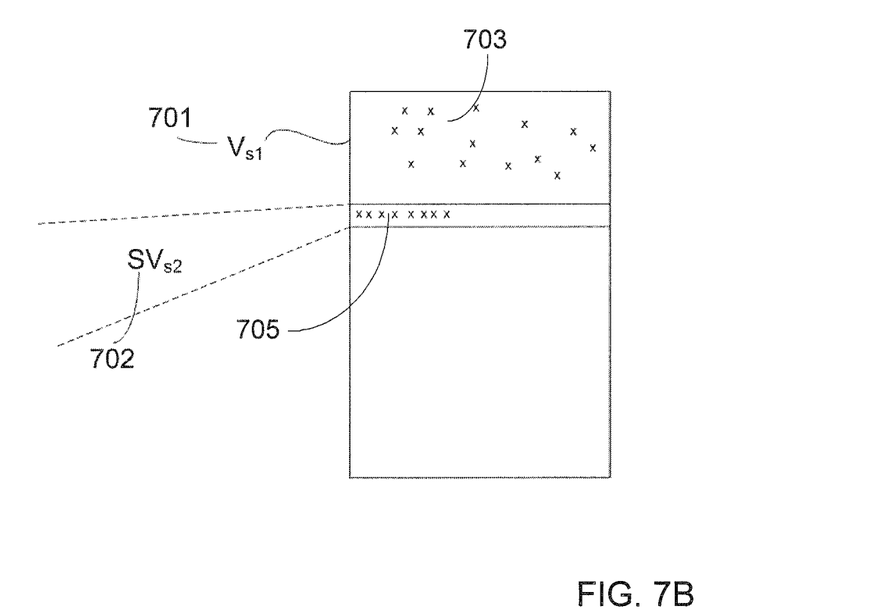

For instance, FIG. 7-B illustrates schematically how the extended pool is used to manage snapshot creation and utilization, in accordance with certain embodiments of the invention. The procedure is similar to that described with reference to FIG. 6, except for the fact that some of the created resources in the pool may be snapshots rather than standard volumes.

Thus, for instance, and as shown in FIG. 7A, the host manager (associated with host 400) issues, through its resource management module (301 of FIG. 3), a "create snapshot $SV_{S2}$ in a pool" command 601 (e.g. imbedded in a SCSI command), so that a snapshot 702 of volume 701 is created. The resource management module 202 of the storage manager 107 executes this command by creating the requested volume of the specified name in the specified pool. Note that at the time of creating the snapshot $SV_{S2}$ 702, $V_{S1}$ already existed, it had been allocated its full storage space within the pool, and this space was partly or fully populated with data that had been written to it 703. But since $SV_{S2}$ is a snapshot, no size is specified for $SV_{S2}$ at the time of creation and there is no actual data associated with $SV_{S2}$ 704 (other than all the data of $SV_{S1}$).

However, with time, data associated with $V_{S1}$ is modified (and stored within the storage space allocated to it in the pool), and at the same time the old data originally associated with $V_{S1}$ is now associated with $SV_{S2}$ (this is part of the standard snapshot mechanism) and hence storage space from within the pool starts to be associated with $SV_{S2}$ (see 705 in FIG. 7B).

The space allocated to $SV_{S2}$ 705 may continue to grow as data associated with the source volume $V_{S1}$ continues to be modified.

Note that up to this point, what the extended pool mechanism has attained, is to define autonomously from the host, via a command issued as a modified SCSI command to the pool volume, a new snapshot associated with the given volume and with the pool. Note also that by this embodiment, no LUN has yet been defined for $SV_{S2}$. In accordance with certain embodiments, LUNs are associated with snapshots only much later, when needed, for example for a recovery or restore situation.

Note also that FIGS. 7A-B are schematic, in the sense that the data associated with the source volume $V_{S1}$ and with the snapshot $SV_{S2}$ is not necessarily physically allocated in proximity as indicated in the diagram. According to the way that the storage system manages its virtualized data on the disks it may be anywhere in the system. The diagram is intended to indicate that in accordance with certain embodiments, space in the pool is fully allocated for standard volumes from the beginning, whereas for snapshots it grows with time.

Note that in accordance with the prior art, volumes/snapshots management operations, including creation and deletion thereof, are performed by storage manager (e.g. 107) typically involving also intervention of a human storage administrator. In contrast, in accordance with certain embodiments, management operations (such as create or delete volumes/snapshots described with reference to FIGS. 6 and 7) are performed by the host manager (1031). The actual access operations (e.g. read, write to and from volumes/snapshots) are performed by the host (101).

The invention is not bound to the specific structure and/or manner of operation depicted with reference to FIGS. 4, 6 and 7.

Figure 8:
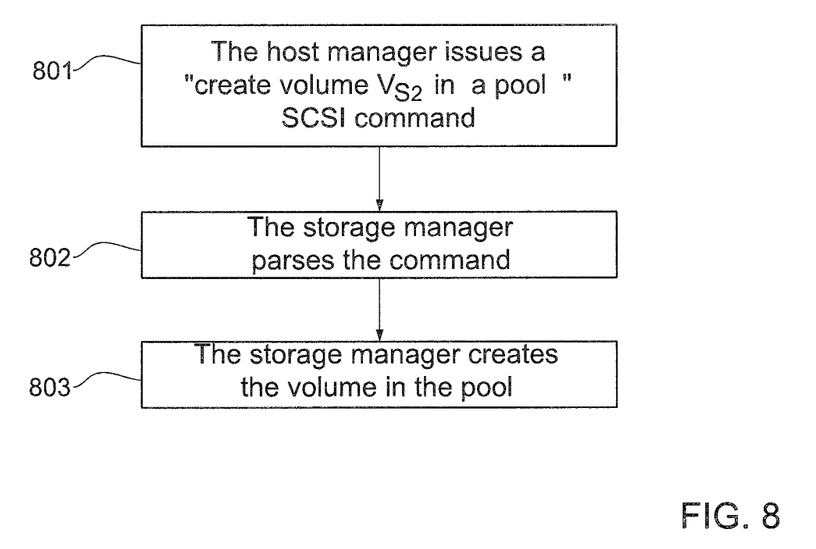
FIG. 8 illustrates a flow chart of a sequence of operations for managing resources in a pool of external virtual memory by a host manager, in accordance with certain embodiments of the invention.

Attention is now drawn to FIG. 8 illustrating a flow chart of a sequence of operations for managing resources in a pool by a host manager, in accordance with certain embodiments of the invention. Thus, at 801 the host manager (associated with host 400) issues a "create volume $V_{S2}$ in a pool" command (e.g. imbedded in a SCSI command) and directs the command to the appropriate pool volume 401. To this end, the host manager utilizes the dedicated handle 402 attaching the host 400 to the pool volume 401.

From the standpoint of the host, the "create volume" command has been invoked and executed. However, as explained with reference to FIG. 6, the storage manager (through its resource management module 202) parses the command 802 and invokes a "create volume in a pool command" 803 in a similar fashion of hitherto known commands for creating a volume (or, respectively, a snapshot) in a pool of external virtual memory.

Note that the sequence of operations with reference to FIG. 8 illustrates one instance of resource management e.g. creating a volume. Management of resources may also include for example deletion of resources (which is implemented mutatis mutandis). Moreover, volume is one example of resource, and other examples may include snapshots or thin volumes.

The following section explains how the host manager can manage (e.g. create/delete) resources (e.g. volumes/snapshots) using a set of management operations (with reference also to FIG. 6). To execute these operations, the host manager needs the appropriate privileges to run these commands on the host, but these privileges do not need to propagate to the storage. Accordingly, if access privileges are defined in relation to the pool volume, then the need to define them again, for each created volume, is obviated.

Note that the commands listed below comply with the SCSI standard and the invention is not bound, neither by extending the SCSI protocol (e.g. possibly extending other I/O protocol), nor by the specific list of commands and/or their respective syntax:

Create Volume

The Storage manager (107 of FIG. 1) creates a volume in a pool by issuing a create volume command of the form Create_Volume Pool_Volume_Name, Volum_Name, Size. This command will create volume Volume_Name of size Size (e.g. $V_{S2}$ 604) in pool 405 associated with pool volume Pool_Volume_Name 401.

The command is imbedded in a SCSI command and directed to the appropriate volume pool. Thus if the host was not granted access to Pool_Volume_Name 401 the command will fail. This method guarantees access control of the hosts only to the pools assigned to them, i.e. pools associated with the pool volume that is attached to the host.

The storage subsystem (e.g. module 201) executes this command by creating the requested volume 604 of the specified name and size in the specified pool 405, allocating a free LUN number to it and creating ITLs which are based on this LUN and initiator ports and target ports which are the same as the ones allocated for the pool volume. By performing this operation, the storage system guarantees that the newly created volume is accessible to all hosts that were granted access to this pool on all previously defined paths (LUNs). This may serve as a security measure for assuring that only authorized host(s) will access a given pool and/or volume or in the case that a given host can access more than one volume, then all the volumes that share the same target port and originate from the same initiator port (of the host) can be accessed by the specified host (typically although not necessarily each volume through its respective LUN). The invention is not bound by the specified security measure.

Unlike the sub-volumes created by Veritas volume discussed in the background of the invention section, the volumes created in accordance with certain embodiments described herein have full instantiation in the storage subsystem (e.g. resource management module 202 of storage manager 107) and do not require further virtualization. There is thus provided in accordance with certain embodiments, a method for managing resources in a storage pool of external virtual memory as described herein, wherein the managing does not utilize virtualization of volumes familiar only to the host manager and not to storage manager.

Delete Volume

Delete volume command is of the form Delete_Volume Volum_Name. This command is imbedded in a SCSI command and directed to the volume itself. Thus if a host had access privileges to the volume it will be able to delete it.

Create Snapshot

Create snapshot command is of the form Create_Snapshot Volume_Name, Pool_Volume_Name. This command will create a snapshot of Volume_Name. The command is imbedded in a SCSI command and directed to the volume for which the snapshot is to be taken. If the host has access to the volume it will be able to create a snapshot in the same pool where the volume resides.

Delete Snapshot

Delete snapshot command is of the form Delete_Snapshot Snapshot_Name, Pool_Volume_Name. This command will delete a snapshot Volume_Name in pool Pool_volume_name. The command is imbedded in a SCSI command and directed to the Pool_volume_name for which the snapshot is taken. If the host has access to the volume, it will be able to delete any of its snapshots.

Query Pool

Query Pool command is of the form Query_Pool Pool_Volume_Name. This command will provide all necessary information about the storage pool associated with Pool_Volume_Name. This information includes the pool size, free space in the pool, all volume/snapshots in the pool 405 and their corresponding sizes. The command is imbedded in a SCSI command and is directed to the Pool_Volume_Name 401. If the host has access to the volume 401 it will be able to execute the Query_Pool command.

It should be noted that the invention is not bound by the specified commands nor by their specific syntax. In accordance with certain embodiments, the fact that the host manager can execute the specified resource management operations, does not exclude the possibility of the storage manager for performing the specified operations (e.g. create and/or delete resources such as volumes/snapshots and/or thin volumes), as is the case with hitherto known storage administrator operations.

Figure 9:
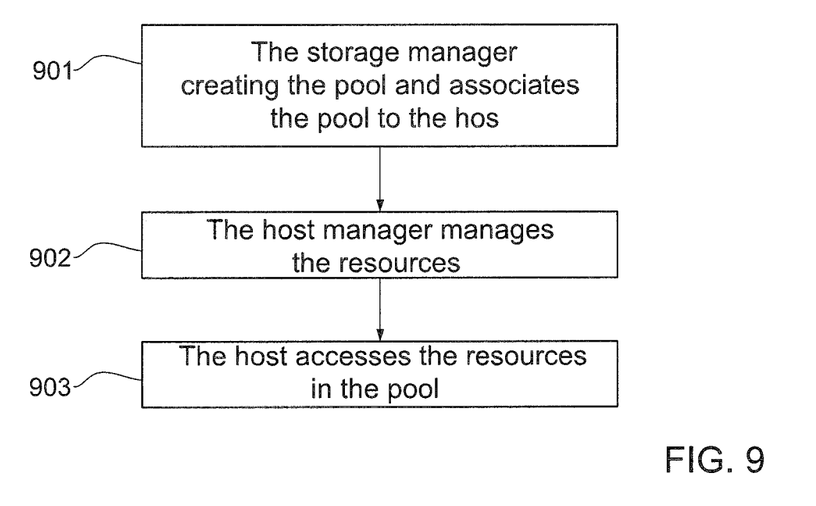
FIG. 9 illustrates a flow diagram of managing resources in a pool of external virtual memory in accordance with certain embodiments of the invention.

Bearing this in mind attention is drawn to FIG. 9 illustrating a flow diagram of managing resources in a pool of external virtual memory, in accordance with certain embodiments of the invention.

Thus, in step 901, the storage manager creates the pool and associates the pool to the host.

In step 902 the host manager manages the resources, e.g. creating/deleting volumes and/or snapshots.

In step 903 the host accesses (e.g. reads data from and/or writes data to) the volume and/or snapshots in the pool. The host accesses the volumes/snapshots through handle(s) (such as LUN 612 of FIG. 6) provisioned by the storage manager, all as known per se. In case of accessing a different volume (say $V_{S2}$ 604 of pool 405), then in accordance with the prior art, the detaching of the handle from volume $V_{S1}$ 605 and re-attaching it to $V_{S2}$ 604 is performed by involving the storage administrator. In order to cope with the latter tedious procedure which involves the storage administrator, an alternative approach can be utilized. According to the latter approach, the host manager is in charge of the handle (e.g. LUN 612) detach and re-attach operations without involvement of the storage administrator, all as taught by co-pending U.S. patent application Ser. No. 12/941,246, entitled "A SYSTEM AND METHOD FOR ACCESSING DATA IN AN EXTERNAL VIRTUAL MEMORY", filed on 8 Nov. 2010 whose content is incorporated herein by reference.

It is accordingly appreciated that in accordance with certain embodiments described above, the storage manager controls all aspects of storage resource allocation including storage space and bandwidth to storage (the amount of ports the host can use in order to access the volumes).

The host manager can control resource management (such as volume/snapshot creation and deletion).

Note that in accordance with certain embodiments, the hosts do not require explicit access privileges to the storage to execute the specified resource management operations, constituting thus an advantage over hitherto known techniques which require manual intervention of storage administrators for implementing resource management such as volume creation or deletion.

Note also that in accordance with certain embodiments, the host manager is not exposed to storage unique management objects like LUNs and ITLs (which are created and attached to the host/volume by the storage manager). Thus, as may be recalled, the pool volume (e.g. 401 in FIG. 4) is viewable to the application by associating the handle (e.g. ITL) to the application by an application viewable volume $V_h$ allowing the application to access the associated volume. Note that the syntax of $V_h$ is operating system specific. For MS windows operating systems for example, $V_h$ is typically of the form X: where X can be any single alphabet letter.

In accordance with certain embodiments and as opposed to regular pools which are visible and can be manipulated by a storage manager only, extended pools exhibit the following behavior:
1. Their overall allocation and their size are controlled by storage manager as regular pools.
2. As opposed to regular pools, extended pools can be physically attached to hosts (e.g. through ITL paradigm). Once they are attached to hosts, the corresponding host manager can create/delete volumes and snapshots within the pool, attach or detach LUNS to them, and attach these volumes/snapshots to the applications running on these hosts.
3. The attachment of an extended pool to a host or to a group of hosts (e.g. provisioning of LUN and ITL for connecting the host to the pool volume) can be done only by a storage manager.
4. The number of connections between the hosts and the storage pool (bandwidth allocation) is assigned by the storage manager. For instance, provisioning of LUNs and ITLs for connecting the host to the pool volume (allowing the host to read from and write to the volumes) is assigned by the storage manager.

In accordance with certain embodiments, the above features guarantee that:
1. Storage resources are managed explicitly by the storage manager.
2. Access control to storage including attaching the host to the pool volume and associating pool volume to pools, bandwidth allocation (e.g. provisioning of # of LUNs) and privileges are managed explicitly by storage managers.
3. Volume creation and deletion in the pool (e.g. resource management) is controlled by host managers, and the corresponding privileges are also controlled by the host (since the host is connected to the pool volume and the pool volume is connected to the pool and therefore the hosts gets privilege to access volumes/snapshots in the pool).

It is accordingly appreciated that in accordance with certain embodiments of the invention, an alternative method for storage management is presented, which, on one hand does not require an additional management on each host, while on the other hand it allows hosts to enjoy all the above mentioned management capabilities without compromising the resource management aspects, which need to be controlled by the storage administrator.

In accordance with certain embodiments, the following limitations of hitherto known techniques, are overcome:
1. While storage managers indeed need to control the allocation of storage space and bandwidth to servers, how that storage is divided into particular volume sizes does not need to be their concern. The number of volumes and volume sizes are much more of the concern of the host manager, as only they really understand what are the hosts/applications needs in that respect.
2. In many cases the host administrator knows much better than the storage administrator when snapshots should be created or deleted, since snapshot creation and deletion time greatly depends on some application related checkpoints.
3. In many cases the host administrator knows much better than the storage administrator when a snapshot that was created should be provisioned and made visible via a LUN.

In embodiments of the presently disclosed subject matter, fewer, more and/or different stages than those shown in FIGS. 5, 8 and 9 may be executed. In embodiments of the presently disclosed subject matter one or more stages illustrated in FIGS. 5, 8 and 9 may be executed in a different order and/or one or more groups of stages may be executed simultaneously. FIGS. 1, 2, 3 illustrate schematically the system architecture in accordance with an embodiment of the presently disclosed subject matter. Each module in FIGS. 1, 2 and 3 can be made up of any combination of software, hardware and/or firmware that performs the functions as defined and explained herein. The modules in FIGS. 1, 2 and 3 may be centralized in one location or dispersed over more than one location. In other embodiments of the presently disclosed subject matter, the system may comprise fewer, more, and/or different modules than those shown in FIGS. 1, 2 and 3.

The subject matter of the present application can have features of different aspects and/or embodiments described above or their equivalents, in any combination thereof.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer program product that includes a storage storing computer code for executing the method of the presently disclosed subject matter.

While various embodiments have been shown and described, it will be understood that there is no intent to limit the presently disclosed subject matter by such disclosure, but rather, it is intended to cover all modifications and alternate constructions falling within the scope of the presently disclosed subject matter, as defined in the appended claims:

The invention claimed is:

1. A method for facilitating management of resources in a storage pool of external virtual memory, comprising:
   (a) by a storage manager of a storage system, creating a pool for accommodating resources permitted to be managed by a host and associating the host with said pool;
   (b) by the storage manager, creating a handle for granting access to said pool by the host and attaching the handle to the host and to said pool;
   (c) receiving by the storage manager, from the host, a management command embedded in an I/O (input/output) command that utilizes the handle, wherein the management command is for managing of a resource in the pool; and
   (d) by the storage manager, executing the command in said pool, if the pool is assigned to the host.

2. The method according to claim 1, further comprising creating a pool volume and associating the pool volume with the pool, wherein said handle includes an initiator port for attaching to the host, a target port for attaching to the pool volume, and LUN uniquely identifying the handle.

3. The method according to claim 1, wherein said management command complies with an I/O protocol.

4. The method according to claim 3, wherein said I/O protocol being the SCSI protocol.

5. The method according to claim 1, wherein said resources are selected from a group that includes at least one of the following, volume, thin volume, snapshot.

6. A system for facilitating management of resources in a storage pool of external virtual memory, comprising:
   a storage manager creating a pool for accommodating resources permitted to be managed by a host and associating the host with said pool and creating a unique handle for granting access to said pool by the host;
   a pool resource control module of the storage manager configured to attach the handle to the host and to said pool;
   the storage manager configured to receive from the host a management command embedded in an I/O (input/output) command that utilizes the handle, wherein the management command is for managing of a resource in the pool; and the storage manager is configured to execute the command in said pool, if the pool is assigned to the host.

7. A non-transitory computer-readable storage medium for facilitating management of resources in a storage pool of external virtual memory, the product includes a storage storing computer code comprising:
   (a) a computer code portion for creating a pool for accommodating resources permitted to be managed by a host and associating the host with said pool;
   (b) a computer code portion for creating a handle for granting access to said pool by the host and attaching the handle to the host and to said pool;
   (c) a computer code portion for receiving by the storage manager, from the host, a management command embedded in an I/O (input/output) command that utilizes the handle, wherein the management command is for managing of a resource in the pool; and
   (d) a computer code portion for executing the command in said pool, if the pool is assigned to the host.

* * * * *